J. M. CAYCE.
BLOWERS.

No. 183,368

Patented Oct. 17, 1876.

WITNESSES:
W. W. Hollingsworth
Solon C. Kemon

INVENTOR:
Jno. M. Cayce
BY
ATTORNEYS.

UNITED STATES PATENT OFFICE.

JOHN M. CAYCE, OF FRANKLIN, TENNESSEE, ASSIGNOR TO HIMSELF, ATHA THOMAS, CHARLES A. BAILEY, JAMES McEWEN, E. B. CAYCE, AND JOSEPH L. PARKS, OF SAME PLACE.

IMPROVEMENT IN BLOWERS.

Specification forming part of Letters Patent No. 183,368, dated October 17, 1876; application filed April 12, 1876.

*To all whom it may concern:*

Be it known that I, JOHN M. CAYCE, of Franklin, in the county of Williamson and State of Tennessee, have invented a new and useful Improvement in Blowers; and I do hereby declare that the following is a full, clear, and exact description of the same.

My invention is a blower designed and adapted for use in increasing the draft in forges and furnaces, for furnishing cooled, moistened, medicated, or fresh air to public buildings, mines, &c., or a drying atmosphere in lumber, grain, or meal kilns, or for supplying air for carbureting and various other purposes.

The object of the invention is particularly to furnish a blower which shall be capable of being operated with the least possible friction, in which the use of valves or other appliances liable to get out of order, and which necessarily add considerably to the cost of the machine, are dispensed with, and which shall be adapted to automatically regulate the amount of air forced through it in a given time. To this end I employ, first, a hollow rotary cylinder, having perforated heads, and provided with a series of curved tubular arms attached to its periphery; and, second, an air-eduction pipe, which forms the hollow axis of the cylinder, and extends upward within the chamber of the cylinder above the level of the water in which the latter revolves; and, thirdly, an expansible liquid-seal air-receiver, which acts as a governor to regulate the speed of the blower, as hereinafter described.

Figure 1:
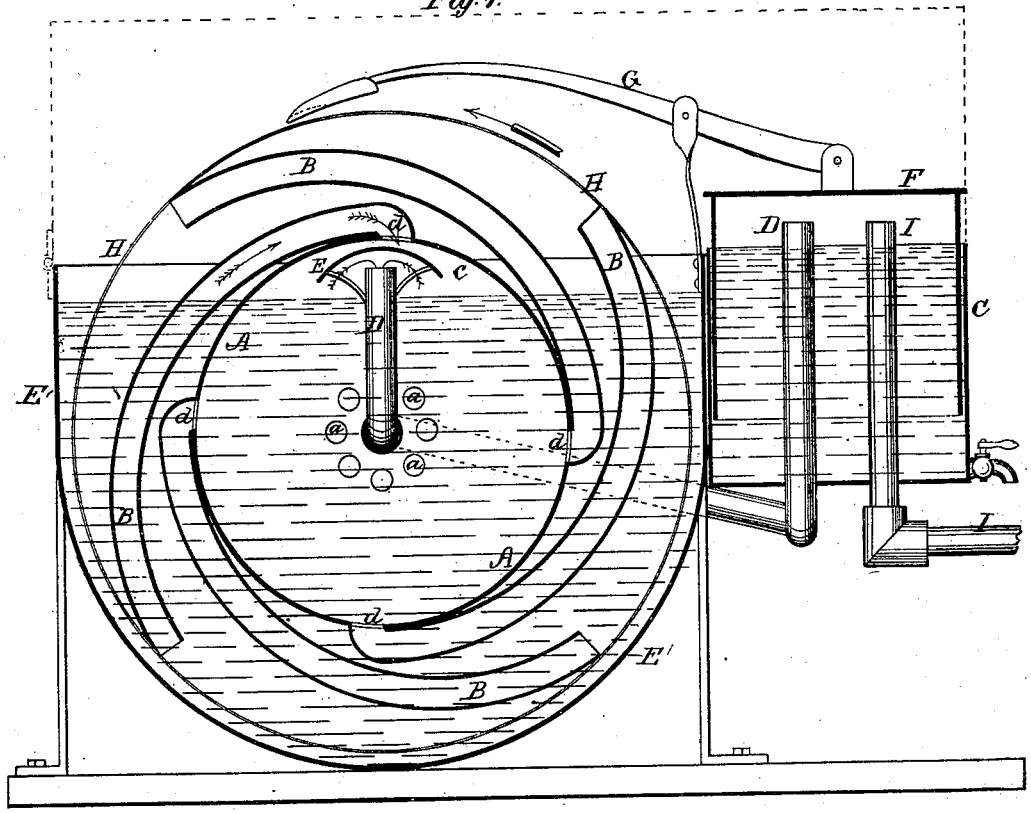
Figure 2:
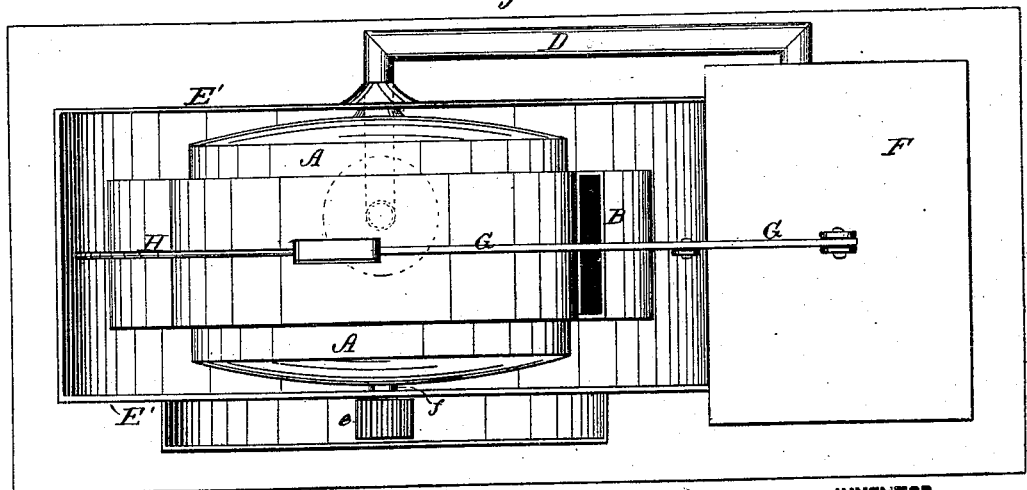

In the accompanying drawing, forming part of this specification, Figure 1 is a sectional elevation of my improved blower, and Fig. 2 a plan view thereof.

The hollow blower-cylinder A is provided with convex heads, each of which has a series of openings, $a$, around its axis, for egress of the water, which enters the chamber of the cylinder through the curved tubular arms B. These arms extend outward from the periphery of the cylinder, and communicate with openings $b$, formed at regular intervals of space around said periphery. The degree of curvature of the arms may be varied considerably within certain limits, but should always conform nearly to the periphery of the cylinder A, to adapt them to offer as little resistance as practicable in passing through the body of water, in which the cylinder is nearly immersed, and also in order that the water may enter said arms freely. The water-column, which enters each of the arms as the cylinder is revolved, acts as a piston, and drives before it the body of air, which fills the arm, and forces it into the hollow space $c$ within the cylinder and above the water, which always maintains the same height within the cylinder as exteriorly thereof, by means of the communication afforded by the aforementioned openings $a$ in the sides of the cylinder. The air thus forced into space $c$ through the several arms B as they successively enter the water and become filled with water enters the pipe D, and is thereby conducted to the receiver C, which will be presently described. That portion of the pipe D which is within the cylinder stands vertical, and extends above the water-level. The mouth of the same is protected by a hood, E, to prevent the drip from the arms through openings $d$ from passing into it.

It will thus be seen that the amount of air taken up and forced through the wheel depends upon the cubical capacity of itself and its tubical arms, together with its speed of rotation, and that, whatever be the speed attained, the water acts uniformly in the same way, and passes in a series of constant currents from the arms B through the body of the cylinder and out through the openings $a$ into the main body contained in the tank E'. It is hence obviously requisite that the aggregate diameter of the openings $a$ shall equal or exceed the aggregate diameter of the arms.

Rotary motion is communicated to the cylinder A by suitable gearing through the medium of the pinion $e$ on the solid axis $f$. The other axis is formed by the pipe D, Fig. 2, which passes unbroken through the side of the tank, as shown, and is rigidly secured to it.

The air-receiver C consists of a vessel or tank filled with water, and a holder, F, which works vertically therein. The air-induction pipe D passes above the water-level, and hence discharges the air directly into the space between the water and head of the holder. The quantity of air thus forced in and at any time contained in the holder determines the height of the holder, or the extent to which it is lifted out of the water, upon the principle of operation familiar in the ordinary gasometer. A lever, G, of the first order is pivoted to the holder F, and its free end works in contact with a band or rod, H, which encircles and is rigidly attached to the tubular arms of the cylinder. It is hence apparent the rise of the holder, by reason of a greater amount of air being forced into it than the eduction or service pipe I can convey away, or is required for use, will cause the lever G to bear upon the band or rod H with corresponding force, and thus hinder the rotation of the cylinder more or less. The speed of the blower is thus automatically regulated by the action of the friction-brake lever, according to the amount of air forced into the liquid-seal receiver in a given time.

By the construction and arrangement of parts above described I produce a cheap, easily-operated, and effective blower, capable of automatic regulation, without the aid of valves or equivalent devices.

What I claim is—

1. In a blower, the rotary cylinder, provided with the curved tubular arms and openings around its axis for egress of water, the curved pipe, standing vertical within the cylinder and forming the hollow axis thereof, through which the air forced into the cylinder is educted, as shown and described.

2. The combination, with the rotary cylinder having tubular arms, of the adjustable liquid-seal air-holder and friction-brake, as shown and described, whereby the speed of the cylinder is automatically regulated, as set forth.

3. The combination of the hood, with the rotating cylinder having tubular arms and peripheral openings $a$, and the pipe standing vertical within the cylinder, as and for the purpose specified.

JOHN M. CAYCE.

Witnesses:
AMOS W. HART,
CHAS. A. PETTIT.